May 24, 1932.   H. L. WORTHINGTON   1,859,643
MAGNETIC MOTOR
Filed Sept. 4, 1929    2 Sheets-Sheet 1

INVENTOR.
Harry L. Worthington.
BY
Baldwin Vale
ATTORNEY.

May 24, 1932.    H. L. WORTHINGTON    1,859,643
MAGNETIC MOTOR
Filed Sept. 4, 1929    2 Sheets-Sheet 2

INVENTOR.
Harry L. Worthington,
BY Baldwin Vale
ATTORNEY.

Patented May 24, 1932

1,859,643

UNITED STATES PATENT OFFICE

HARRY L. WORTHINGTON, OF SAN FRANCISCO, CALIFORNIA

MAGNETIC MOTOR

Application filed September 4, 1929. Serial No. 390,285.

This invention relates to improvements in magnetic motors driven by varying the course of the magnetic flux of magnets and more particularly to the said flux varying means.

Among the objects of the invention are to provide means whereby the attraction and repulsion of permanent magnets for each other may be converted into motion by introducing a shunt into the magnetic flux of one of a pair of magnets in repulsive juxtaposition, to create an attractive magnetic field, then changing the polarity of said shunt to restore the repulsive magnetic field, to cause one of said magnets to be alternately attracted to and repelled from the other.

Another object is to utilize the attraction of a permanent magnet for a magnetizable mass, by varying the flux in said mass to repulse the magnet.

A further object is to increase the speed and minimize the power necessary to cause a permanent magnet to pass a magnetizable mass in a fixed path.

A permanent magnet is normally attracted to a magnetizable mass, and is repulsed by said mass if the polarity of the mass is rendered repulsive to the magnet.

Two permanent magnets will repel each other if the north pole of one is arranged in juxtaposition to the north pole of the other. In this latter relation they will move toward each other if one of them is shunted by an armature placed across its poles.

I have discovered that a helix coil on the armature will reverse the polarity of the armature when an electric current is passed through the coil.

The normal armature, soft iron, or silica steel, or the like, is attractive to the magnet to which it is applied, until excited by the electric current flowing in the repulsive direction, when it then becomes repulsive to said magnet.

This phenomenon is utilized to make a series of permanent magnets arranged in repulsive relation, alternately attractive and repulsive to each other by intermittently exciting said armatures or shunts electrically.

For further particulars reference is made to the United States Patent to Harry L. Worthington, Number 1,724,446, issued August 13, 1929, entitled Magnetic motors, and his copending application, Serial Number 372,163, filed June 19, 1929, in the same class, regarding the use of permanent magnets.

In this specification and the annexed drawings the invention is illustrated in the form considered the best. But it is to be understood that it is not limited to such form, because it may be embodied in other forms. It is also to be understood that in and by the claims following the description it is desired to cover the invention in whatsoever form it may be embodied.

In the accompanying two sheets of drawings:

Figure 4 is an end elevation of the distributor for the selector timing of the operation of said coils.

Figure 1:
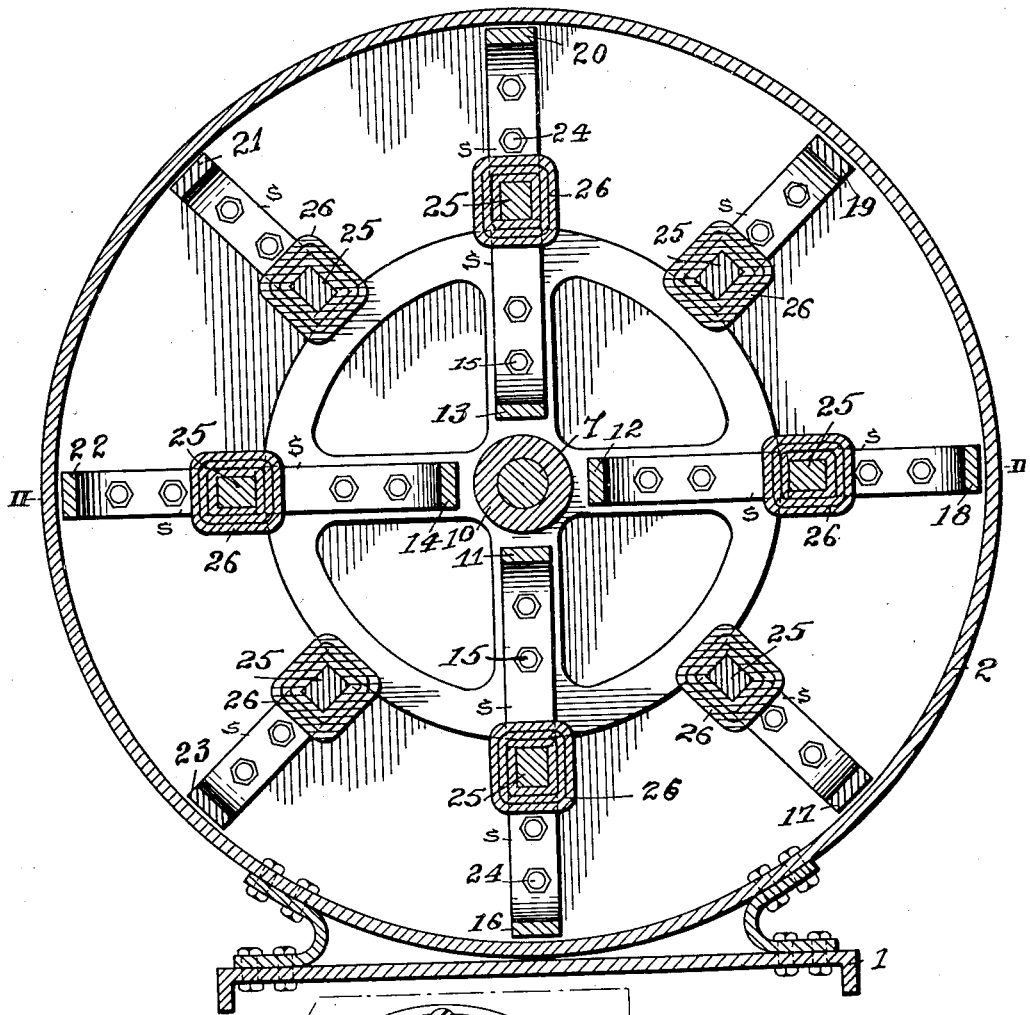
Figure 1 is a vertical section of a magnetic motor constructed in accordance with this invention. (See line I—I, Figure 2.)
Figure 2:
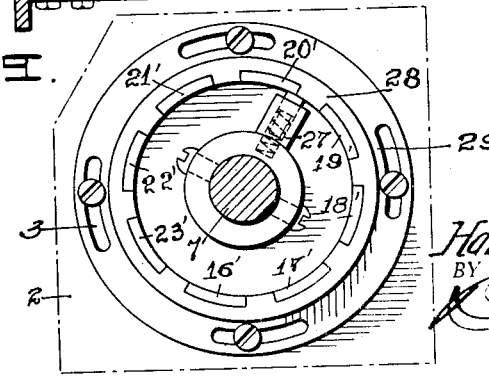
Figure 2 is a horizontal section of the same. (See line II—II, Figure 1.)
Figure 2:
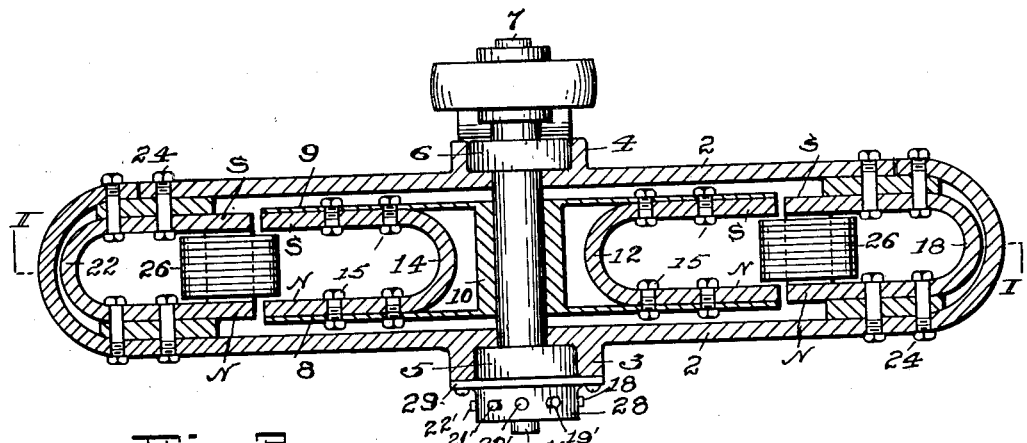

In detail the construction illustrated in the drawings, referring to Figure 1, comprises the base 1, supporting the enclosing non-magnetic casing 2. This casing is preferably made in two sections for convenience in assembling. The casing is provided with hubs 3, 4, to receive suitable anti-friction bearings 5, 6, for the shaft 7.

The rotor comprises the opposed non-magnetic spiders, 8, 9 on the hub 10, which is fixed on the shaft 7. The rotor magnets 11, 12, 13, 14 are fixed between the spiders 8, 9 to which they are secured by the bolts 15.

These rotor magnets are arranged with all their poles in repulsive relation to each other seriatim. For instance, all their north poles N are on the spider 8 side and all their south poles S are on the spider 9 side, with the pole ends in concentric alignment with the axis of the shaft 7.

The stator magnets 16, 17, 18, 19, 20, 21, 22, 23 are fixed in the casing 2 between the opposed sections thereof, to which they are secured by the bolts 24.

The pole ends of these stator magnets are also arranged in concentric alignment with the axis of the shaft 7, and in lateral alignment with the pole ends of said stator magnets. The poles N—S of the stator magnets are arranged in repulsive relation to the N—S of the rotor magnets. That is, the S poles of the stator magnets are aligned with the S poles of the rotor magnets, and their respective N poles in the same relation, so that these respective magnets normally repel each other.

The soft cores or armatures 25 interposed between the pole ends N. S., of each stator magnet, normally act as shunts for the magnetic flux of their respective stator magnets, converting them in effect into ring magnets neutralizing their polarity and rendering them non-repulsive to the rotor magnets.

The rotor and stator magnets arranged in normally repulsive relation, are rendered attractive to each other by the armatures 25, neutralizing the polarity and/or varying the flux path of the stator magnets.

The helix coils 26 encircle the armatures 25 which then become electromagnetic when excited by current flowing through these coils. The polarity of the respective ends of the armatures is determined by the direction of flow of the current passing through said coils.

If this direction of flow is properly chosen the armatures 25 are rendered repulsive to both the rotor and stator magnets, which are normally in repulsive relation also.

It is the function of these coils 26 to neutralize the attraction between the armatures 25 and the stator and rotor magnets, so that these magnets may function repulsively to each other.

It is obvious that if the energizing of the coils 25 is properly timed, the rotor and stator magnets will be alternately attracted and repulsed by each other and the rotor caused to rotate.

This timing is accomplished by a distributor operated by the shaft 7 and adapted to make and break the flow of current to the coils 26.

This distributor is illustrated in Figure 4, and comprises the brush 27 having a hub fixed on the end of the shaft 7. This brush rotates within the dielectric shell 28, provided with internal peripheral contacts 16′, 17′, 18′, 19′, 20′, 21′, 22′, 23′, connected with the coils 26 on the respective stator magnets designated by the same ordinals. This shell 28 has a slotted flange 29, adjustably secured to the casing 2 for adjusting the advancing or retarding of the energizing period of the coils 26, with respect to the rotation of the shaft 7.

Referring to Figure 4, the brush 27 is just passing to the contact 20′. The contacts 16′, 18′, 20′, 22′ are in the same circuit and energize the coils 26 on the stator magnets 16, 18, 20, 22 simultaneously. The contacts 17′, 19′, 21′, 23′ are in another circuit and energize the coils 26 on the stator magnets 17, 19, 21, 23 simultaneously.

There are eight stator magnets and distributor contacts, so there are four impulses given the stator coils 26 with each one-eighth revolution of the shaft 7. These impulses influence the adjacent four rotor magnets on the rotor, alternately attracting and repulsing them as described.

In the present instance the rotor and stator magnets 11—16, 12—18, 13—20, 14—22, are just passing from attraction and will pass into repulsion when the contact 20′—27 is made.

The closing of the succeeding contacts 21′—27 will energize the coils 26 on the stator magnets 17, 19, 21, 23 and restore these magnets to their normal repulsive relation to the rotor magnets 11, 12, 13, 14 respectively, and make the cores of the electro-magnets repulsive to both the stator and rotor magnets.

This alternate attraction and repulsion will continue as long as current is fed to the coils 26 through the distributor.

Figure 3:
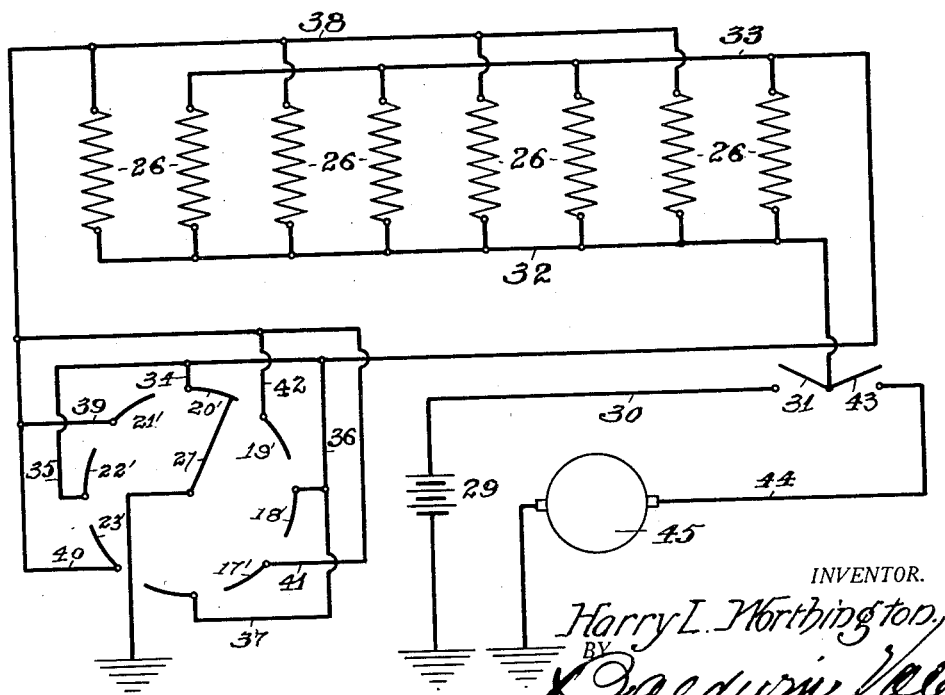
Figure 3 is a wiring diagram of the electric circuit for energizing the armature coils.

Referring to the wiring diagram Figure 3, current flows from the battery 29, over the wire 30 across the switch 31 to the bus wire 32, through the coils 26 in multiple therewith, and the return bus wire 33 and the distributor wires 34, 35, 36, 37 to the contacts 20′, 22′, 16′, 18′, respectively, thence across the brush 27 to the ground and back to the battery 29.

The other set of coils 26 on the stator magnets receive current from the battery 29, across the switch 31, the bus wire 32, through the coils 26, connected with the bus wire 38, over the division wires 39, 40, 41, 42 to the contacts 21′, 23′, 17′, 19′, respectively, thence across the brush 27, to the ground and back to the battery.

Current can also be provided in the circuits described by closing the switch 43 in the line 44, from the generator 45, which is also grounded.

It is obvious that by a simple reversal of parts, like results can be obtained by applying the coils 26 to the rotor magnets instead of the stator magnets as shown.

The use of odd and even numbers of magnets on the rotor and stator, respectively, instead of even numbers as shown, will improve the torque curve by removing any "dead centers" of attraction and repulsion. For instance, three, five, seven or nine magnets, more or less may be arranged on the rotor to cooperate with eight, ten, twelve, fourteen, more or less, on the stator, by changes in the structure of the motor and current distributing means, within the skill of those skilled in this art. The capacity of the motor can be increased to any practical extent by multiplying the rotor and stator magnets longitudinally of the shaft 7.

This invention will operate without the stator magnets, which merely contribute a repulsive force, when the shunts thereon are neutralized.

The masses of the soft iron cores 25 are normally attractive to the rotor magnets 11, 12, 13, 14. But if they are given a positive polarity by the current flowing through the coils 26, as described, they can be made repulsive to said rotor magnets.

Likewise, they can be made more attractive to the rotor magnets by inducing an attractive polarity in the cores 25. That is to say, as the rotor magnets approach the cores 25, these cores can be electrically magnetized to present S poles to the N poles of the rotor magnets and attract them.

Contrawise, at the proper instant, the polarity of the cores 25 can be reversed, by reversing the direction of flow of the current through the coils 26, rendering these cores repulsive to the passing rotor magnets. This gives both a pull and push impulse to the rotor magnets from the cores 25, by the obvious expedient of introducing the conventional current reversing means in the power circuit of the coils 26.

This invention is in effect the inversion of the magneto, and is believed to mark a departure in the art.

The use of electric current in this manner keeps the associated permanent magnets up to near saturation.

It is also obvious to those skilled in the art that the relative positions of the cores 25 and the permanent magnets may be reversed. That is the permanent magnets may be made the stator element and the cores be mounted upon the rotor with like results.

Having thus described this invention, what I claim and desire to secure by Letters Patent is:

1. A motor comprising in combination movable permanent magnets, fixed permanent magnets, the poles of said magnets being arranged in repulsive relation, and means for electrically modifying the flux of said magnets whereby the movable magnets will move past said fixed magnets.

2. A motor comprising in combination a movable permanent magnet, a fixed permanent magnet, the poles of said mognets being arranged in repulsive relation, one of said magnets being shunted, and means for reversing the polarity of said shunt.

3. A motor comprising a rotor, permanent magnets carried by said rotor, having their poles parallel to the axis of said rotor, a stator, permanent magnets carried by said stator having their poles also arranged parallel to the axis of said rotor, the poles of the magnets upon the rotor and upon the stator being arranged in repulsive relation, one of said sets of magnets being shunted, and electrical means for intermittently reversing the polarity of said shunts.

4. A motor comprising a rotor having a set of permanent magnets thereon, a stator having a set of permanent magnets thereon, arranged in repulsive relation to said rotor magnets, armatures across the poles of one of said sets of magnets, windings on said armatures, and means for intermittently passing an electric current through said windings.

5. A motor comprising a rotor having a set of permanent magnets thereon, a stator having a set of permanent magnets thereon arranged in repulsive relation to said rotor magnets, electro-magnets arranged in proximity to said permanent magnets and means for reversing the polarity of said electro-magnets.

6. A motor comprising a rotor having a set of permanent magnets thereon, a stator having a set of permanent magnets thereon arranged in repulsive relation to said rotor magnets, electro-magnets arranged in proximity to said permanent magnets, a source of electric current connected to said electro-magnets, and a distributor interposed in said connection between said source and said electro-magnets and driven by said rotor.

7. A motor comprising a rotor having a set of permanent magnets thereon, a stator having a set of permanent magnets thereon arranged in repulsive relation to said rotor magnets, electro-magnets having their cores arranged to normally shunt the flux of one of said sets of magnets, means operated by said rotor for intermittently energizing said electro-magnets.

8. A motor comprising a rotor having a set of permanent magnets thereon, a stator having a set of permanent magnets thereon, arranged in repulsive relation to said rotor magnets, armatures across the poles of one of said sets of magnets to normally neutralize their repulsion to said other set of magnets, windings on said armatures adapted to reverse the normal polarity of said armatures in circuit with a source of electric current, a circuit interrupter in said circuit, operated by said rotor.

In testimony whereof I have hereto set my hand this 31st day of August, A. D. 1929.

HARRY L. WORTHINGTON.